E. D. FINK.
Ground-Pulverizer.

No. 213,185.  Patented Mar. 11, 1879.

WITNESSES:
C. Neveux
C. Sedgwick

INVENTOR:
E. D. Fink
BY Munn & Co
ATTORNEYS.

UNITED STATES PATENT OFFICE.

EARL D. FINK, OF COLUMBUS, OHIO.

IMPROVEMENT IN GROUND-PULVERIZERS.

Specification forming part of Letters Patent No. 213,185, dated March 11, 1879; application filed August 6, 1878.

*To all whom it may concern:*

Be it known that I, EARL D. FINK, of Columbus, in the county of Franklin and State of Ohio, have invented a new and Improved Ground-Pulverizer, of which the following is a specification:

The object of my invention is to furnish a machine for rolling and pulverizing plowed ground, to render the soil loose and mellow, and in a good condition for planting. Rollers have been used for somewhat similar purposes, but they simply crush the clods and pack the soil.

My invention consists in a roller having a surface of rods or bars, which cut and split the clods of earth, and spiral flights or conveyers inside of the roller that level the soil and discharge at the end of the cylinder the dirt which passes through the bars.

Figure 1:
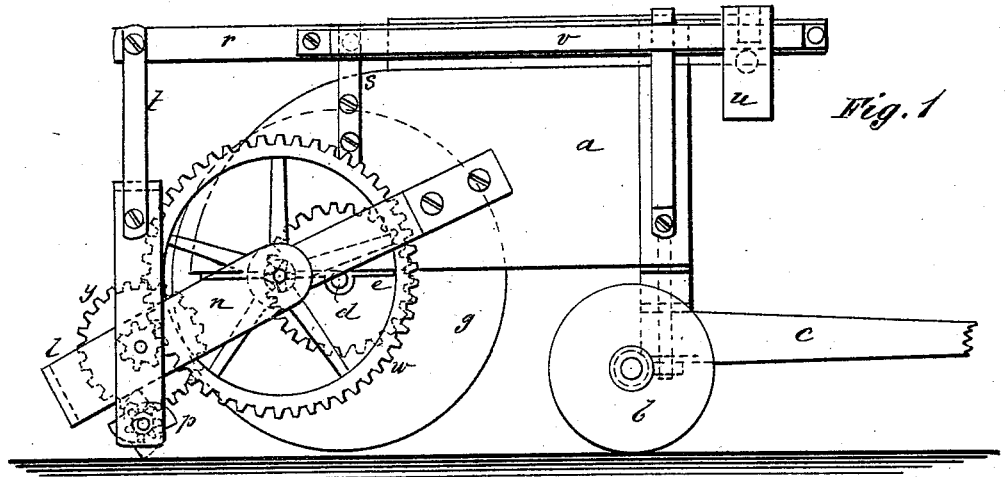
Figure 2:
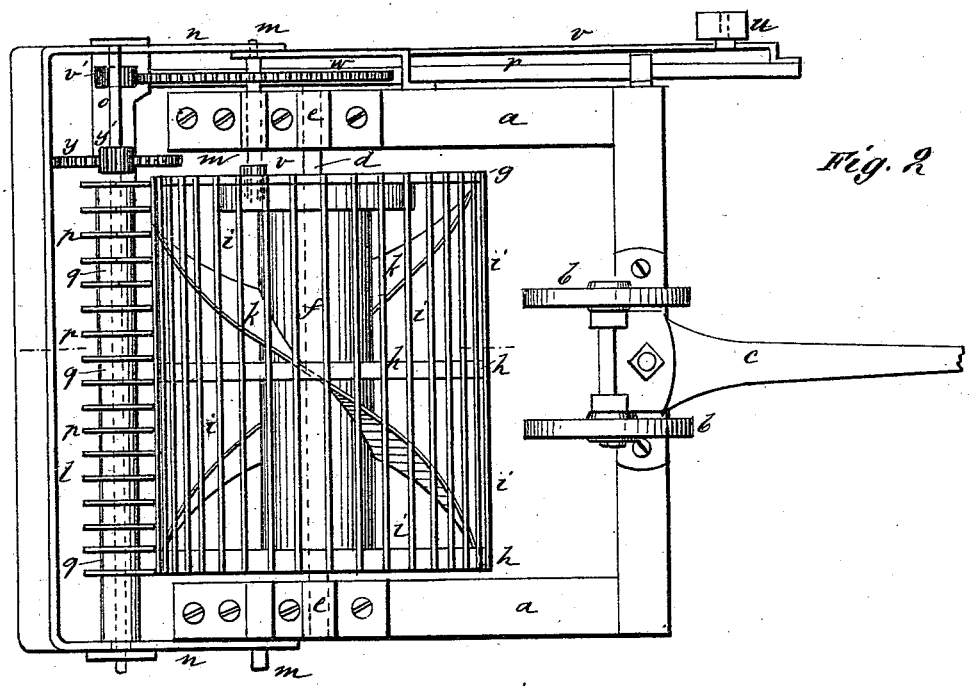
Figure 3:
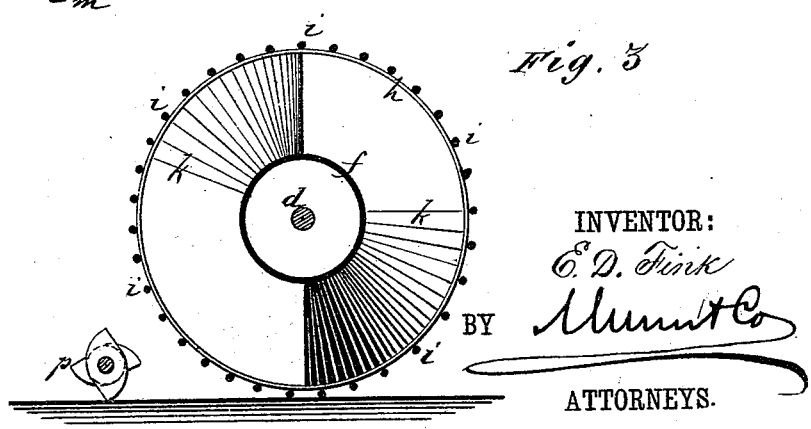

In the drawings, Figure 1 is a side elevation of my machine. Fig. 2 is an inverted plan of the same; and Fig. 3 is a cross-section of the roller and of the shaft which carries the cutting-blades.

Similar letters of reference indicate corresponding parts.

$a$ represents the frame of the machine, having at its forward end the pilot-wheels $b$ and pole $c$ for the attachment of horses. The cutting and leveling roller next described is at the rear part of the frame $a$, and is held by trunnions $d$ in bearings $e$.

$f$ is the roller-shaft, carrying upon one end a circular plate, $g$, which forms a head for the roller. The shaft $f$ carries annular strips $h$, that are held concentric with $f$ by arms or spokes entering the shaft $f$.

$i\ i$ are rods or bars secured a short distance apart around the head $g$ and rings or strips $h$, and thereby forming a roller. The rods $i$ rest upon the ground when the machine is in use.

$k\ k$ are spiral conveyers around the shaft $f$, and extending in width from $f$ to the inner side of bars $i$. The direction of the conveyers $k$ is such as to throw the dirt toward the open end of the roller.

$l$ is a swinging frame, hung by arms $n$ upon the pins $m$, that are attached upon the under side of frame $a$. This frame $l$ carries a horizontal shaft, $o$, which extends across the rear of the machine adjacent to the leveling-roller.

$p\ p$ are cutting-blades strung upon the shaft $o$, and separated from each other by washers $q$. One end of the shaft $o$ has a solid head, and the other end is to be provided with a nut for tightening the cutters $p$ upon the shaft.

The cutting-blades $p$ are made from thin steel plates, and have a rounded cutting-edge at each end, so that they will give a shearing-cut and free themselves from grass or trash.

The shaft $o$ is raised or lowered to cause the cutters $p$ to run more or less shallow by the swinging of the frame $l$.

$r$ is a lever, hung upon a standard, $s$, at one side of frame $a$; $t$ is a link from the short end of lever $r$ to frame $l$, and $u$ is a sliding weight on a bar, $v$, at the side of lever $r$.

The weight $u$ is to be moved to or from the fulcrum of $r$, so as to balance the frame $l$ more or less, and thereby regulate the depth to which the cutters work. The swinging of the frame $l$ also permits the cutters to adjust themselves to uneven ground.

As the machine moves forward the cutting-roller is revolved by contact of the bars $i$ with the ground. The head $g$ of this roller is provided with an internal gear meshing with a small pinion, $v$, on the pin $m$, which supports one end of frame $l$. This pin $m$ is the arbor for pinion $v$, and also carries a gear-wheel, $w$, which meshes with a pinion, $b'$, on a shaft on frame $l$, above shaft $o$. This secondary shaft carries a gear-wheel, $y$, meshing with a pinion, $y'$, on the cutter-shaft $o$. By this gearing I obtain a very rapid rotation of the cutter-shaft.

The bars $i$ of the cutting-roller separate and break up the clods of earth and level the surface. The earth which passes through the bars is acted upon by the conveyers $k$ and carried out at the open end of the roller. The cutters $p$, following immediately after, cut up and comminute the soil, so that it is in good condition for receiving seed. This apparatus may also be used to advantage, in cultivating young corn, for destroying the grass and weeds.

I do not limit myself to the described manner of mounting the roller and cutting-knives, nor to the arrangement of gearing shown for revolving the cutters, as these details may be varied without departing from my invention.

Having thus fully described my invention, I claim as new and desire to secure by Letters Patent—

The cutting and leveling roller having a surface of rods or bars, and provided with internal flights or conveyers, substantially as and for the purposes set forth.

EARL D. FINK.

Witnesses:
G. G. COLLINS,
AUGUSTIN CONVERSE.